Feb. 16, 1926. 1,573,566
C. R. NICHOLS
DISTRIBUTING AND PLACEMENT DEVICE FOR PLASTIC MATERIAL IN
CENTRIFUGAL PROCESSES AND PROCESS OF USING THE SAME
Filed April 20, 1925 2 Sheets-Sheet 2
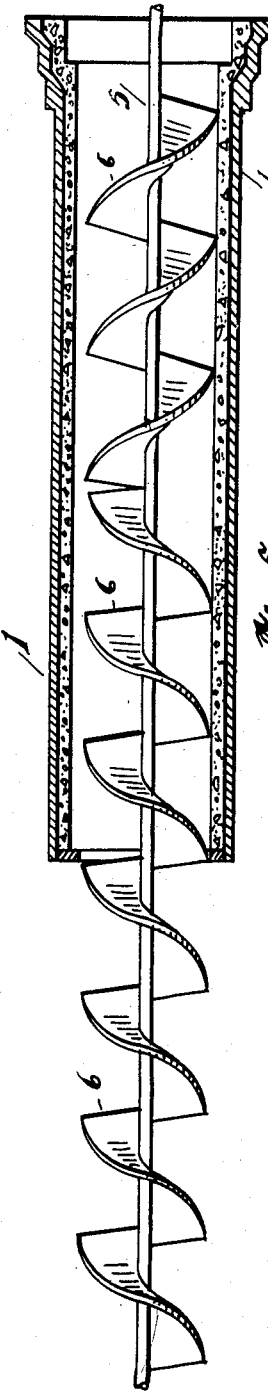
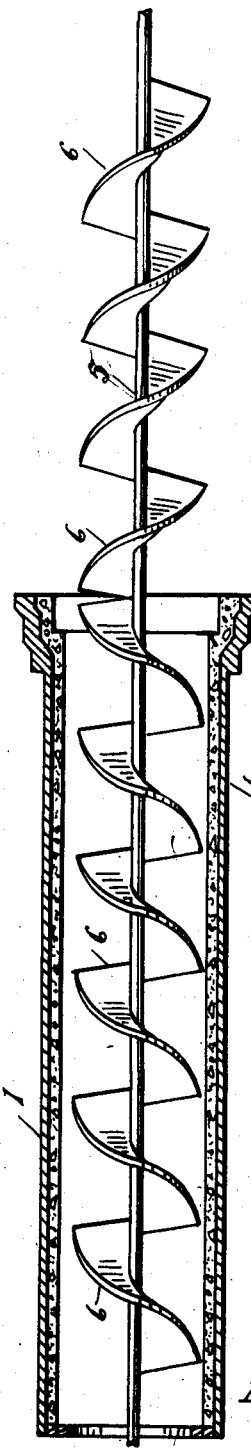
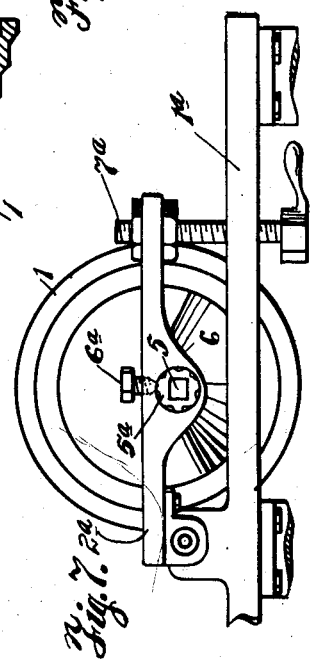
C.R. NICHOLS
INVENTOR.
BY
ATTORNEY.

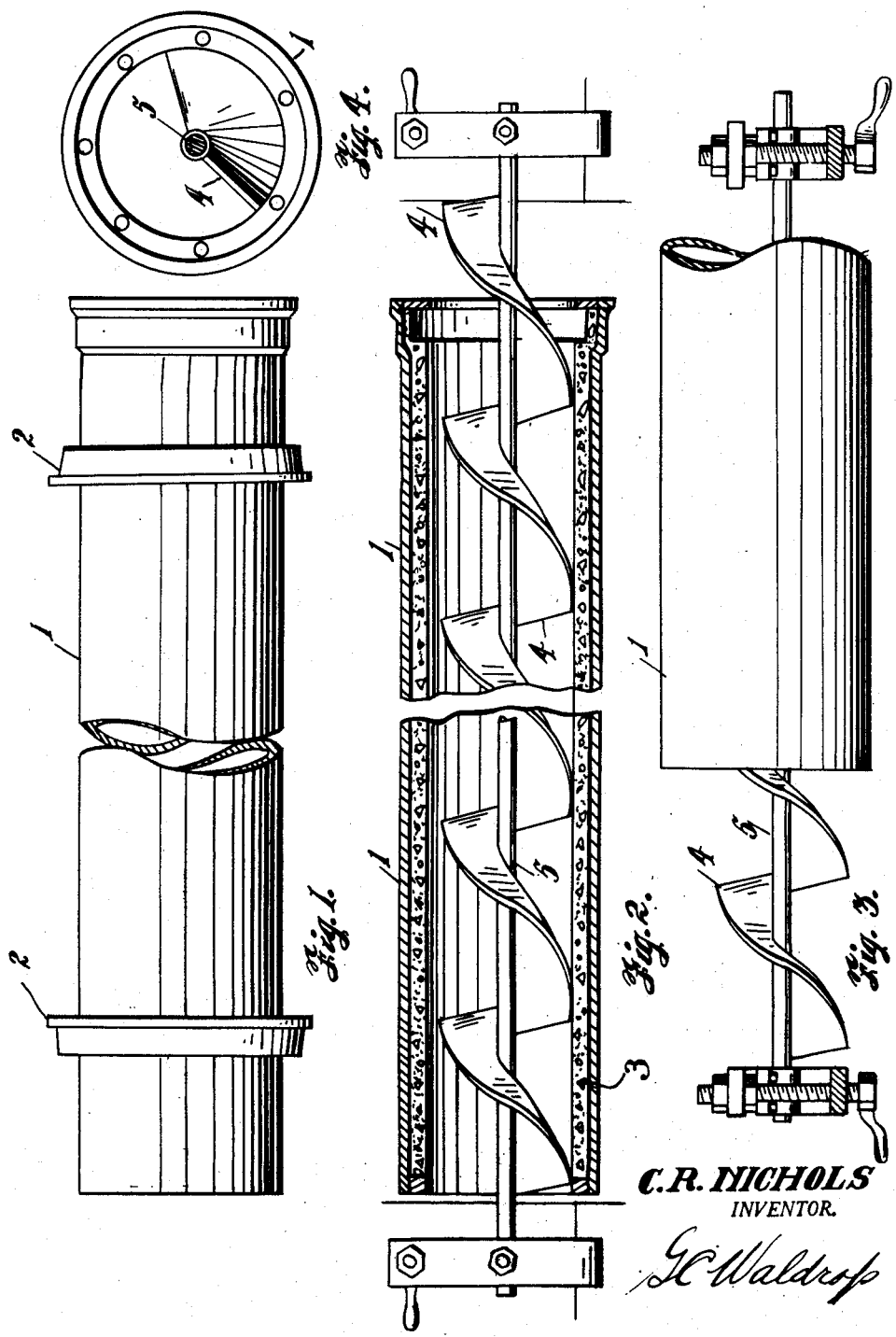

Patented Feb. 16, 1926.

1,573,566

UNITED STATES PATENT OFFICE.

CLIFFORD R. NICHOLS, OF DALLAS, TEXAS.

DISTRIBUTING AND PLACEMENT DEVICE FOR PLASTIC MATERIAL IN CENTRIFUGAL PROCESSES AND PROCESS OF USING THE SAME.

Application filed April 20, 1925. Serial No. 24,626.

*To all whom it may concern:*

Be it known that I, CLIFFORD R. NICHOLS, a citizen of the United States, residing at Dallas, in the county of Dallas and State of Texas, have invented certain new and useful improvements in distributing and placement devices for plastic material in centrifugal processes and processes of using the same, of which the following is a specification.

This invention relates to a machine and process for centrifugally forming articles and hollow bodies from plastic materials such as concrete, cement, mortar and other cementitious agglomerates, and it refers more particularly to a device for the centrifugal placement or depositing of plastic materials in the process of forming bodies or of applying coatings and surfacings upon the inner peripheries or walls of hollow cylindrical bodies, such as cast iron conduits, pipes and other like products, and it refers further to the construction of such bodies with or without the use of re-inforcing mediums.

The invention also especially contemplates the provision of a means acting in co-operation with the centrifugal force obtained by the revolving of such bodies in the desired placement and distribution of the plastic material within the forming body, in the case of the manufacture of cementitious bodies or hollow pipes, and the desired placement and distribution of the coating material for the surfacing of the inner walls of such bodies as cast iron pipe.

A further object of the invention aims to provide a means for the placement and even distribution of cementitious plastic materials in the construction of hollow pipes or like products, or the placement of corrosion and tuberculotion resisting materials upon the inner walls of metal pipes or conduits in co-operation with centrifugal force.

A further object of the invention is to provide such a material distributing and placement means in such form as to be readily removable from the interior of the body being formed or coated before or after completion of the product without marring or scratching the smooth and polished interior of such body.

Still further, the invention aims also to provide as the material distributing and placement means, a quarter or a segment of a spiral flight conveyor, which latter is arranged to continuously contact with the inner periphery of the product during the process of formation or surfacing, whereby to produce uniform thickness of the finished product and to insure substantially a smooth periphery within the latter.

Yet another object of the invention includes the provision of a suitable means for placing and adjusting the levelling means, consisting of the conveyor flights, whereby to impinge the inner arcs of the product at any desired point, which adjustment also permits of any desired wall thickness as hereinbefore mentioned.

Further objects and advantages of the invention will be enumerated and described in the course of the following detailed description, of which the annexed drawings form a part.

Figure 1 represents a longitudinal elevation of a form or mold.

Figure 2 is a sectional view of the form, disclosing the position of the spiral flight conveyor or distributing means therein, which has a continuous lead, also the lateral positioning means for the conveyor.

Figure 3 is a fragmentary view showing the manner in which the material placement means may be used in connection with the lining of pipes, conduits or other like products, which also illustrates an end view of the positioning means.

Figure 4 shows an end view of the form, illustrating one of the positions assumed by the conveyor therein.

Figure 5 represents a modified form of the conveyor or material placement means on which the leads are oppositely arranged, the purpose of which will be later described.

Figure 6 shows the manner in which the material placement means is partially withdrawn from the form or pipe in order to remove superfluous water and material therefrom during or after completion of the product, such distribution or placement means having a right and left hand flight, and Figure 7 shows a side elevational view of the conveyor positioning means.

Heretofore, the distribution and placing of material in the art of making and lining products with plastic materials by centrifugal processes has been accomplished in various ways, such as ramming, jigging or shovelling the material through the mold or article under formation, or possibly by means of a screw conveyor. However, it has been found that these methods prove costly in that they require an excess of labor, investment and time in placing the material, and do not accomplish such placement in the most satisfactory manner to obtain uniform density. Also a certain degree of porousness is in evidence in the finished product where proper density and firmness is not produced. The present invention aims to correct this state by providing a distributing agent as described, which engages the material as it is fed into the form and distributes the same therethrough in cooperation with the force developed by the rotation of the article being formed or coated. The contact of the flights of the distributing and placement means, have lateral and longitudinal adjustments, relative to the material over the entire surface of the body being coated or formed, as the case may be. It further eliminates irregular surfaces on the inner peripheries and insures an even and thoroughly densified product. The positioning means, as previously mentioned, becomes universally applicable at such time as the initial coat has been applied to the wall of the product, such universal action being brought about by the partial withdrawal of the conveyor flights from the periphery of the product, and which may be continued until the desired wall thickness is attained.

Proceeding in accordance with the present invention, 1 denotes a metal form which is rotated at a high rate of speed sufficient to attain centrifugal placement of the aggregate of which the article is being molded. Cement, mortar or other agglomerate 3 is deposited in sufficient quantities by any suitable means into the end or ends of the pipe being coated. Intermittent distribution of the material through the pipe is accomplished by the distributing and placement means, which, in this construction is a section of spiral flight conveyor indicated at 4 in Figure 2, which, it will be understood, may be maintained at any desired location with respect to its contact with the inner periphery of the product while the form or pipe is being rotated about it. This conveyor may also be reciprocated at will longitudinally within the body being formed or coated to effect the smoothing or trowelling of the surface.

In Figure 7 is illustrated one form of mechanism whereby the conveyor 6 is positioned laterally within the form. This mechanism consists of a base 1ª, having a fulcrum arm 2ª pivoted thereto. The squared end of the shaft 5 is provided with a cylindrical bearing 5ª, centrally disposed in the fulcrum arm 2ª, and which may be revolved as desired or may be maintained rigid with respect to the arm 2ª by engaging the set screw 6ª with one of a series of depressions in the bearing provided therefor.

In Figure 6 the conveyor 4 is shown divided into segments of a circle, as the occasion requires, and in Figure 4 it is shown mounted upon a shaft or support 5. The distributing means constituted by the conveyor is also movable at right angles to the body being formed or coated, as set forth above, which constitutes the lateral adjustment to effect said wall thickness.

To allow for the increasing thickness and decreasing inner diameter of the product undergoing formation within the form or mold, the circular scribe of the conveyor flights may be of smaller diameter than the diameter of the product when the latter is in a finished state, to permit ready removal of the placement means to prevent scratching or marring the inner surface of the product, which is still in a plastic state, such removal being accomplished by manipulating the regulating screw 7ª to centrally position the shaft 5, thereby withdrawing the flights 5, thus eliminating danger of contact and resultant disfiguration of the product.

In the modifications illustrated in Figures 5 and 6, the product is deposited into either end of the form or pipe substantially in equal quantities, and due to the reverse leads of the conveyor 6, the material thus deposited is merged in the center of the form 1 as is obvious in Figure 5, until sufficient quantity is deposited therein to form the body of the product or the coating, as the case may be, at which time the means 6 is shifted to the position as illustrated in Figure 6 to allow only a single lead of the placement means 5 to be retained in the body of the product, which action, co-operating with the rotation of the form or mold, produces a swabbing, trowelling or finishing effect upon the inner surface of the product and removes superflous water and material therefrom.

It should be understood herein that as the peripheral speed of the object being formed or coated, may be varied, or the size of the object being formed or coated may be varied; or the consistency of the forming or finishing materials may be varied, the angle, position or radial sweep of the placement means may be varied so as to properly perform their functions in the most desirable manner, and fall within the meaning and scope of what is herein claimed:

1. In combination with a rotatable form for centrifugally cast products; conveying means mounted within the form to successively relay material longitudinally therethrough; means to effect lateral adjustment of said conveying means within the form during the centrifugal placement of said material therewithin in accordance with the varying inner diameter of the product, and means to permit removing the said conveying means from the form.

2. In combination with a rotatable form for centrifugally cast products, a material depositing and distributing agent longitudinally mounted through said form, whereby to move the material through the form correspondingly with the rotating action of the latter; means for adjusting the said material depositing and distributing agent laterally within the form to permit the material engaging means thereon to correspond with the decreasing inner diameter of the product, and means to permit removing the distributing means from the form.

3. In a rotatable form for centrifugally prepared products, a material placing means therefor including a support longitudinally mounted in said form; said material placing means arranged on said support to swipingly engage the inner periphery of the product in plastic form, correspondingly to the rotating action of the latter to uniformly deposit the material therein; means to permit longitudinally moving the said material placing means within the form whereby to effect removal of superfluous material from said form and to produce a trowelling effect upon the interior surface of the product, and means for laterally positioning said material placing means with respect to the inner periphery of the article being prepared.

4. A material distributing and placing device for centrifugally prepared products in combination with a rotatable hollow body, including a plastic material conveyor arranged to be longitudinally mounted in said body; said conveyor consisting of a series of flights forming a segmental part of a spiral and arranged to successively engage said material correspondingly to the rotation of said body; means for adjusting the position of said conveyor in accordance with the building up of the product within the body, and means to permit removing the conveyor from said body.

5. A material distributing and placing device for centrifugally cast articles including a material conveyor arranged to operate within said article; a rotatable mounting for said material conveyor; means permitting reciprocation of said rotatable mounting longitudinally in said article; means for laterally adjusting said mounting within the article in accordance with the varying thicknesses of the latter during the forming process, and means to permit removing the material distributing and placing means from the article.

6. A material conveying and distributing means in combination with a hollow rotating body; said conveying and distributing means arranged to longitudinally distribute said material within the body in accordance with the speed of rotation of said body thereabout, and with the centrifugal reaction of the material within the body resulting from such rotation, means permitting longitudinal and lateral adjustment of said material distributing means within the body and means permitting removal of the distributing means from within the body.

7. In combination with a machine for forming plastic materials into hollow bodies; a body forming mechanism in which the said body is arranged to be rotated about a stationary support having means thereon whereby to successively relay the forming material of said body lengthwise of the latter, and means to effect lateral positioning of said support with respect to the interior of the said body in accordance with the varying thickness of the walls of the body.

8. In combination with a machine for forming plastic materials into hollow bodies; means arranged to be inserted into the body having material distributing flights thereon disposed so as to impinge and form the inner periphery of the said body during rotation of the latter; means permitting removal of said latter means from the body during such rotation to temporarily suspend the formation of the walls of said body, and means for permitting reinstatement of said means within the body during rotation thereof to resume the building up of said wall.

9. In combination with a rotatable form for centrifugally cast products, conveying means for moving material within the form, and means to effect lateral adjustment of said conveying means within the form during the centrifugal placement of said material therewithin in accordance with the varying inner diameter of the product.

10. In combination with a rotatable pipe to be lined with plastic material, conveying means mounted within the pipe to successively relay material longitudinally therein; means to effect lateral adjustment of said conveying means within the pipe during the centrifugal placement of said material therewithin in accordance with the varying thickness of the plastic material on the inner wall of the pipe, and means permitting removal of the said conveying means from the pipe.

11. In combination with a rotatably mounted hollow pipe to be centrifugally lined with plastic material, a material depositing and distributing agent longitudinally mounted within said pipe, whereby to move the plastic material through the pipe correspondingly with the rotating action of the latter; means for laterally adjusting the said material depositing and distributing agent within the pipe to permit the material engaging means thereon to correspond with the decreasing inner diameter of the pipe, and means permitting removal of the distributing means from the pipe.

12. In a machine for lining hollow pipe with plastic materials by centrifugal process, a material placing means therefor including a support longitudinally mounted in said pipe; said material placing means arranged on said support to swipingly engage the inner periphery of the plastic material, correspondingly to the rotating action of the pipe to uniformly deposit the material therein; means to permit longitudinally moving the said material placing means within the pipe whereby to effect removal of superfluous material from said inner periphery and to produce a trowelling effect upon the interior surface of the lining, and means for laterally positioning said material placing means with respect to the inner periphery of the plastic lining.

13. A material distributing and placing device for centrifugally lining hollow bodies in combination with the rotation of such bodies, a plastic material conveyor formed to be longitudinally mounted in said body; said conveyor consisting of a series of flights forming a segmental part of a spiral and arranged to successively engage said material correspondingly to the rotation of said body; means for adjusting the position of said conveyor in accordance with the building up of the thickness of the lining within the body, and means permitting removal of the conveyor from said body.

14. A material distributing and placing device for centrifugally lining hollow articles including a material conveyor arranged to operate within said hollow article; a rotatable mounting for said material conveyor; means to permit reciprocating said rotatable mounting longitudinally in said hollow article; means for laterally adjusting said mounting within the article in accordance with the varying thicknesses of the latter during the lining process, and means to permit removing the material distributing and placing means from the finished product.

15. A material conveying and distributing means in combination with a hollow rotating pipe; said conveying and distributing means arranged to distribute plastic material upon the inner periphery of said pipe in accordance with the speed of rotation of said pipe thereabout, and with the centrifugal reaction of the material within the rotating pipe resultant from varying speeds of rotation, means to permit longitudinal and lateral adjustment of said material distributing means within the rotating pipe, and means permitting of removal of said conveying and distributing means from said pipe while the latter is rotating.

16. The process of forming plastic compositions into hollow elements, which consists in centrifugally depositing the composition progressively longitudinally of and against a conforming surface and controlling the lateral placement of the composition to form a series of superimposed annuli.

In testimony whereof I affix my signature.

CLIFFORD R. NICHOLS.